(No Model.)  2 Sheets—Sheet 2.
W. BIEDERMANN.
KETTLE OR STILL.
No. 304,405.  Patented Sept. 2, 1884.
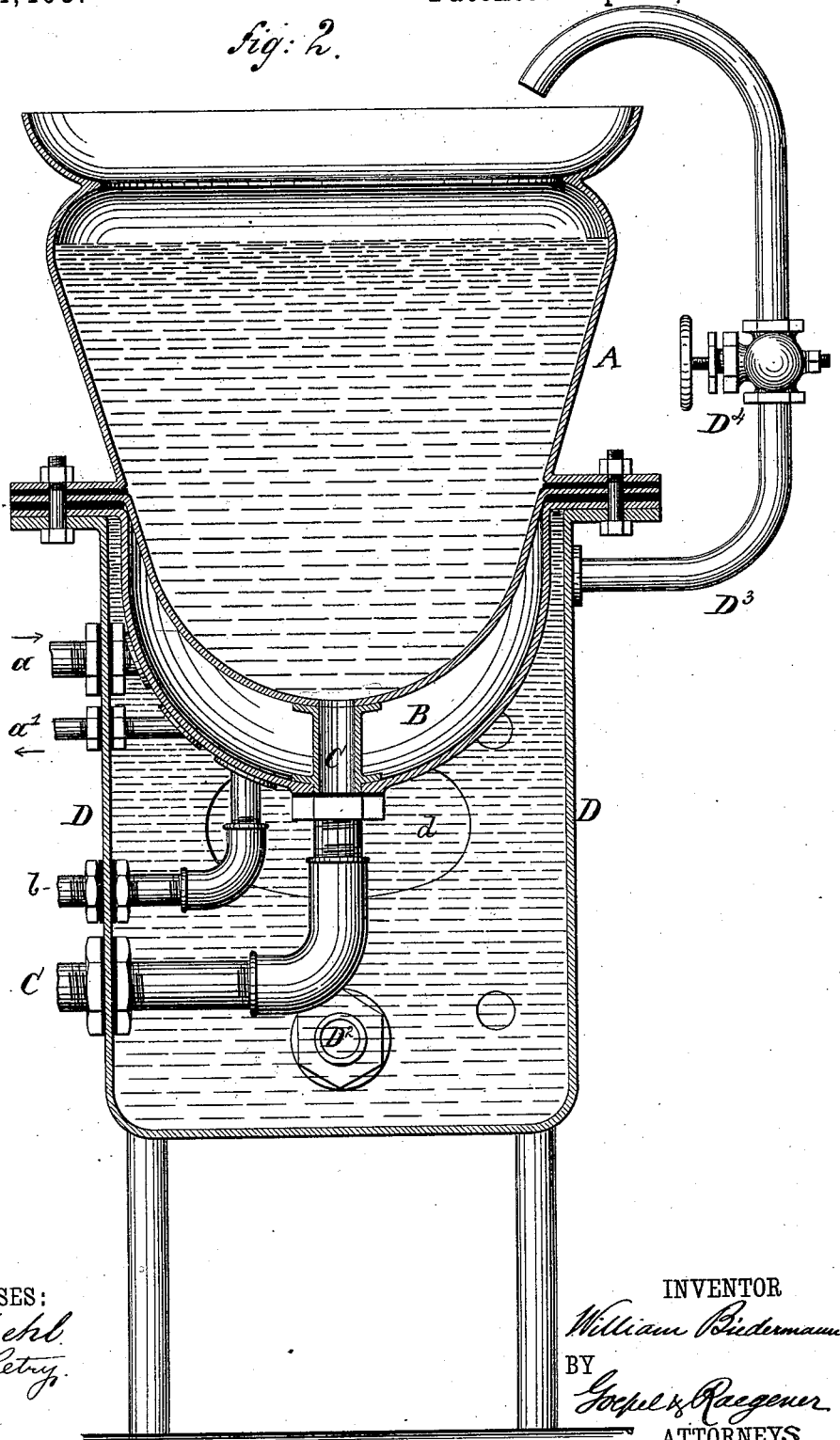
WITNESSES:
A. Schehl
Martin Petry
INVENTOR
William Biedermann
BY
Goepel & Raegener
ATTORNEYS.

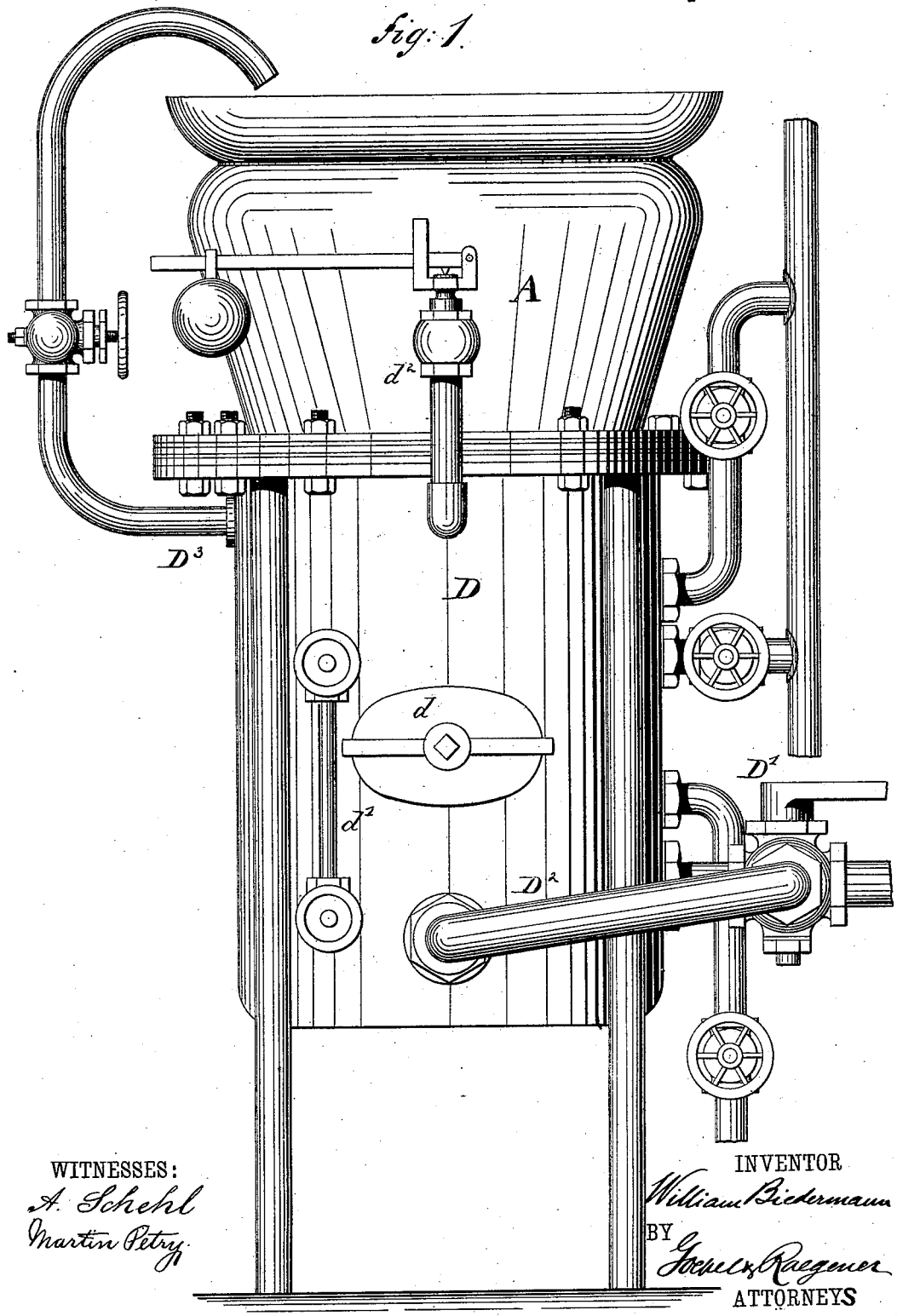

UNITED STATES PATENT OFFICE.

WILLIAM BIEDERMANN, OF NEWARK, NEW JERSEY.

KETTLE OR STILL.

SPECIFICATION forming part of Letters Patent No. 304,405, dated September 2, 1884.

Application filed April 12, 1884. (No model.)

*To all whom it may concern:*

Be it known that I, WILLIAM BIEDERMANN, of Newark, in the county of Essex and State of New Jersey, have invented certain new and useful Improvements in Kettles and Stills, of which the following is a specification.

This invention has reference to certain improvements in steam-jacketed kettles or stills, by which a larger amount of heating-surface is brought into use for heating purposes, and thereby the heat of the steam utilized in a higher degree.

The invention consists of a steam-jacketed kettle or still, which is provided below the steam-jacket with a closed auxiliary boiler, the latter being connected with the kettle or still by a discharge-pipe and a valved branch pipe, and with the upper part of the kettle or still by a return-pipe that keeps up the circulation through the auxiliary boiler.

In the accompanying drawings, Figure 1 represents a front elevation of my improved kettle or still, and Fig. 2 is a vertical central section of the same.

Similar letters of reference indicate corresponding parts.

A in the drawings represents a kettle or still, and B a steam-jacket, which extends around the bottom of the same in the usual manner. Steam is supplied to the jacket B by a steam-supply pipe, $a$, and conducted off by a steam-discharge pipe, $a'$. The water of condensation collecting at the bottom of the jacket is conducted off through the pipe $b$, as customary in steam-jacketed kettles or stills. The contents of the boiler or still A are drawn off by a discharge-pipe, C, which is attached to the lowest point of the kettle or still, said discharge-pipe passing through a stuffing-box at the bottom of the steam-jacket B. The larger exterior surface of the steam-jacket B, instead of being covered, as heretofore, by a suitable non-conductor of heat, is surrounded by an auxiliary closed vessel or boiler, D, of cylindrical shape and suitable size. The boiler D is attached steam-tight by a flange at its upper edge and intermediate packing to the flange of the steam-jacket, which is attached to the flange of the kettle or still, as shown in Fig. 2. The closed boiler D is provided with the usual accessories—a man-hole and cover, $d$, a gage, $d'$, a safety-valve, $d^2$, &c., as shown in Fig. 1.

The discharge-pipe C of the kettle or still is conducted through the side wall of the boiler D to the outside, where it communicates, by a two-way cock, D', with a branch pipe, $D^2$, that enters the boiler near its lower part.

To the upper part of the boiler D is attached a bent upwardly-extending return-pipe, $D^3$, provided with a stop-cock, $D^4$, so as to conduct the contents of the boiler D back into the kettle or still A. When the charge in the kettle or still is to be exposed to boiling, the two-way cock D' is placed in such a position that the auxiliary boiler D is entirely filled by means of the branch pipe $D^2$. The contents of the boiler D are heated by the outer larger surface of the steam-jacket B, and lifted, by the pressure in the boiler D, through the return-pipe $D^3$ back into the kettle or still, the contents of which are heated by the inner surface of steam-jacket B in the usual manner. As the contents of the auxiliary boiler D are heated under pressure, a continuous circulation of the liquid to be boiled is kept up from the kettle or still to the boiler D and back again to the kettle or still A. As both surfaces of the steam-jacket are used for heating purposes, the heating capacity of steam is utilized in a more perfect and effective manner. The contents of the kettle or still are thereby raised to the boiling-point in a quicker manner than with the steam-jacketed kettles or stills heretofore in use, and a considerable saving of fuel obtained by the use of my improved construction.

Having thus described my invention, I claim as new and desire to secure by Letters Patent—

1. The combination of a kettle or still, a steam-jacket at the lower part of the same, a closed auxiliary boiler inclosing the steam-jacket, a supply-pipe connecting said kettle or still with the boiler, and a return-pipe that conducts the contents of the boiler back into the kettle or still, substantially as set forth.

2. The combination of a kettle or still, A, a steam-jacket, B, a closed auxiliary boiler, D, inclosing the steam-jacket, a discharge-pipe, C, having a two-way cock, D', and a branch pipe, $D^2$, for connecting the kettle or still with the boiler, and a return-pipe, $D^3$, connecting the upper end of the boiler with the top of the kettle or still, substantially as set forth.

In testimony that I claim the foregoing as my invention I have signed my name in presence of two subscribing witnesses.

WILLIAM BIEDERMANN.

Witnesses:
PAUL GOEPEL,
SIDNEY MANN.